Oct. 11, 1960 R. T. BURNETT 2,955,681
DISK BRAKE

Filed Jan. 13, 1954 4 Sheets-Sheet 1

INVENTOR.
RICHARD T. BURNETT
BY Cecil J. Arens
ATTORNEY

Oct. 11, 1960     R. T. BURNETT     2,955,681
DISK BRAKE
Filed Jan. 13, 1954                      4 Sheets-Sheet 2
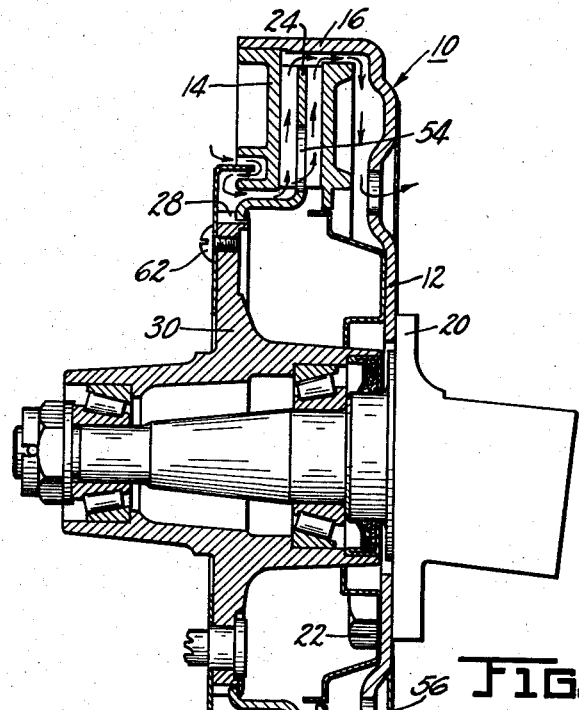
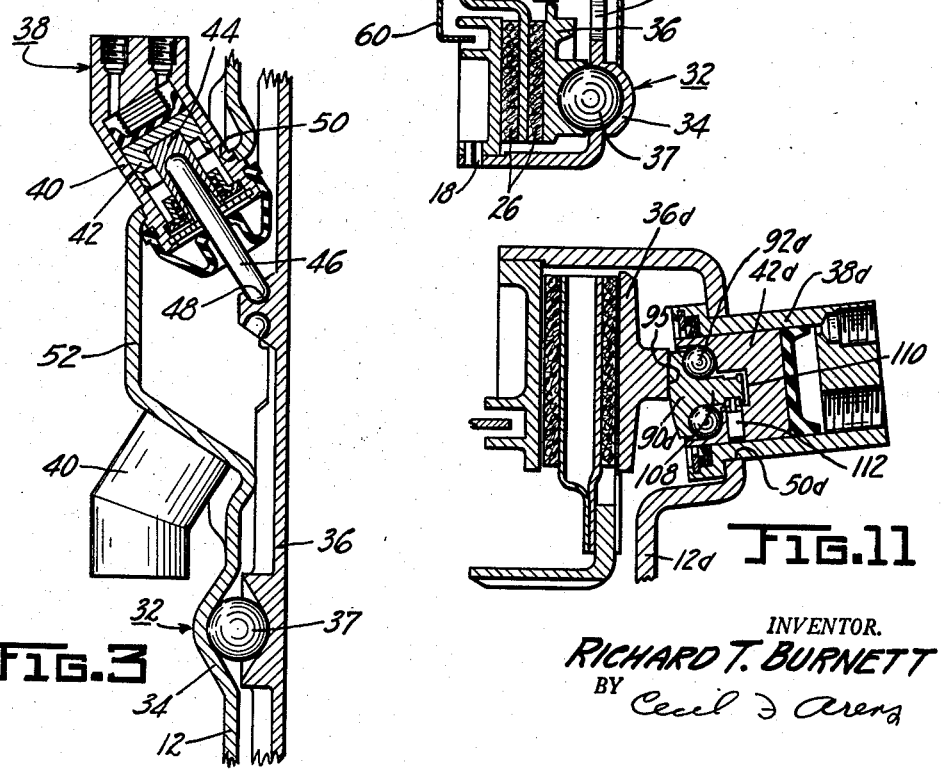
INVENTOR.
RICHARD T. BURNETT
BY
ATTORNEY Oct. 11, 1960 — R. T. BURNETT — 2,955,681
DISK BRAKE
Filed Jan. 13, 1954 — 4 Sheets-Sheet 4

INVENTOR.
RICHARD T. BURNETT
BY Cecil J. Aers
ATTORNEY

United States Patent Office 2,955,681
Patented Oct. 11, 1960

2,955,681

DISK BRAKE

Richard T. Burnett, South Bend, Ind., assignor to The Bendix Corporation, a corporation of Delaware Filed Jan. 13, 1954, Ser. No. 403,672

6 Claims. (Cl. 188—72)

This invention relates to disk brakes and more particularly to improvements in disk type brakes wherein the friction-producing elements are self-energizing components of the brake.

An object of the invention is to provide improved actuating means for disk braking.

Another object of the invention is to avoid the friction and misalignment problems which heretofore were present in wheel cylinders associated with disk brakes of the type herein disclosed.

Another object of the invention is to provide forced circulation of air as a coolant through the brake thus producing reduced operating temperatures to minimize thermal effects on the operating characteristics of the brake.

A further object of the invention is to obtain an improved wheel cylinder construction which provides for the multi-directional movement of the member to be applied.

The above and other objects and features of the invention will appear more fully hereinafter from a consideration of the following description, taken in connection with the accompanying drawings, wherein a plurality of embodiments of the invention are illustrated by way of example.

In the drawings:

Figure 1 is a composite view of a side elevation of the brake assembly illustrating in segments; (a) the brake reaction plate, (b) a section view taken between the reaction plate and rotor viewed toward the inboard side of the brake, (c) a section between the rotor and pressure plate looking toward the inboard side of the brake, and (d) a section view taken between the pressure plate and backing plate looking toward the inboard side of the brake;

Figure 3 is a fragmental section view taken on the line 3—3 of Figure 1 and illustrating the actuating means for applying the brake;

Figure 4 is a section view of the brake taken on line 4—4 of Figure 1;

Figure 1:
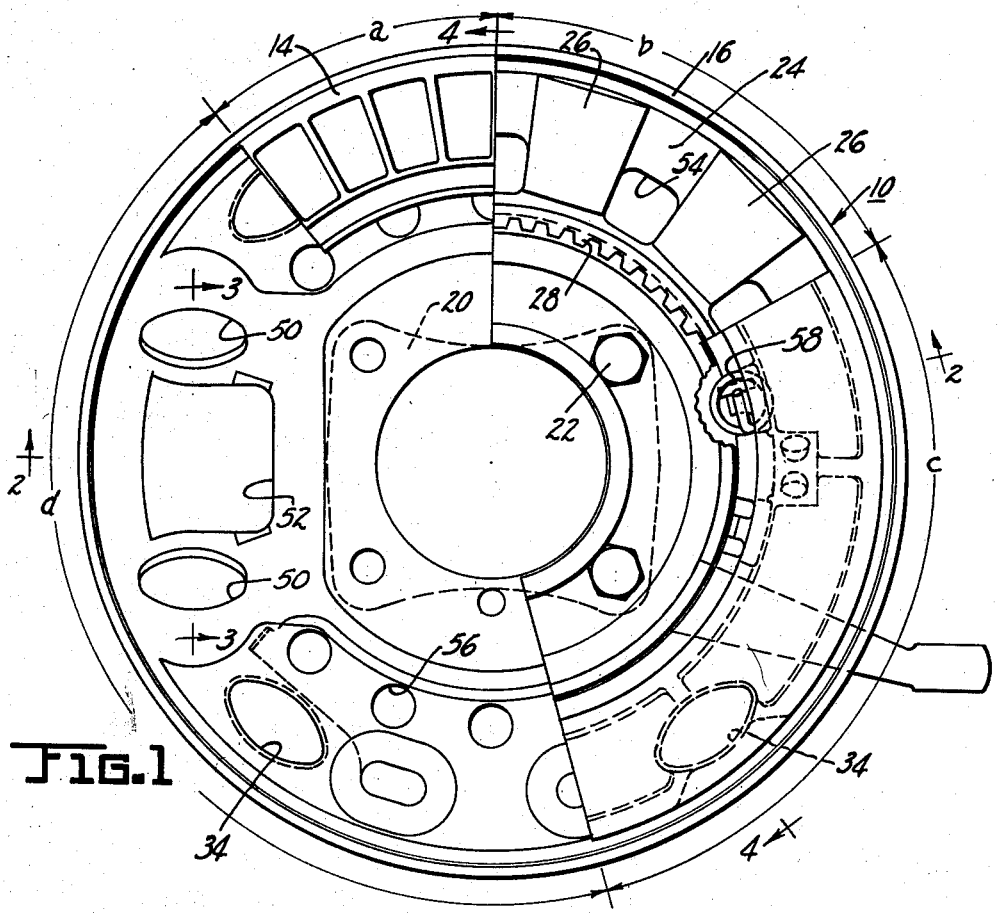
Figure 2:
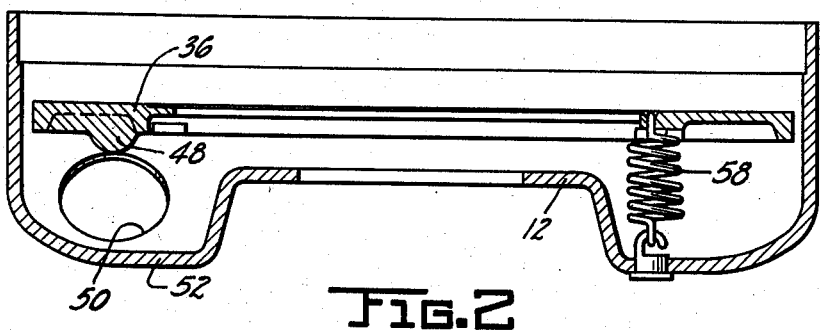
Figure 2 is a section view taken on the line 2—2 of Figure 1.
Figure 5:
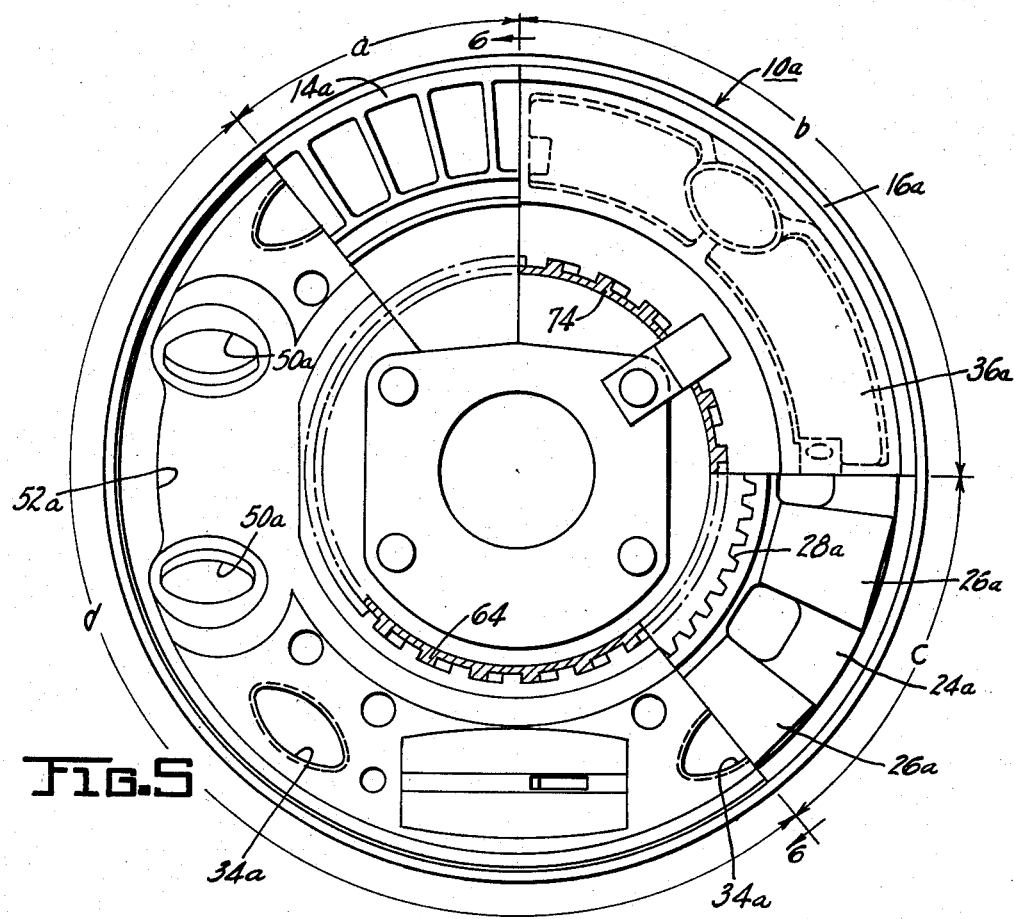
Figures 7, 12:
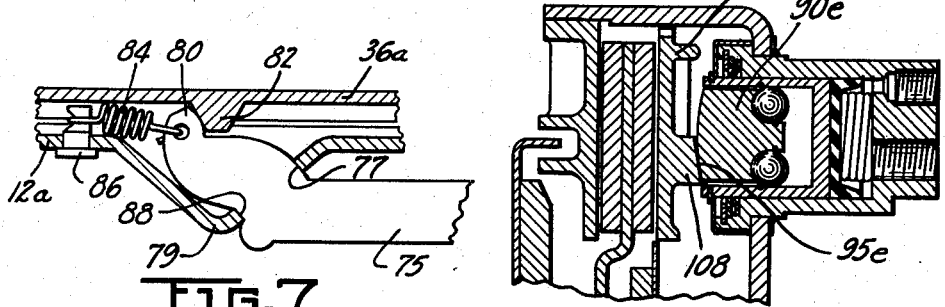
Figure 6:
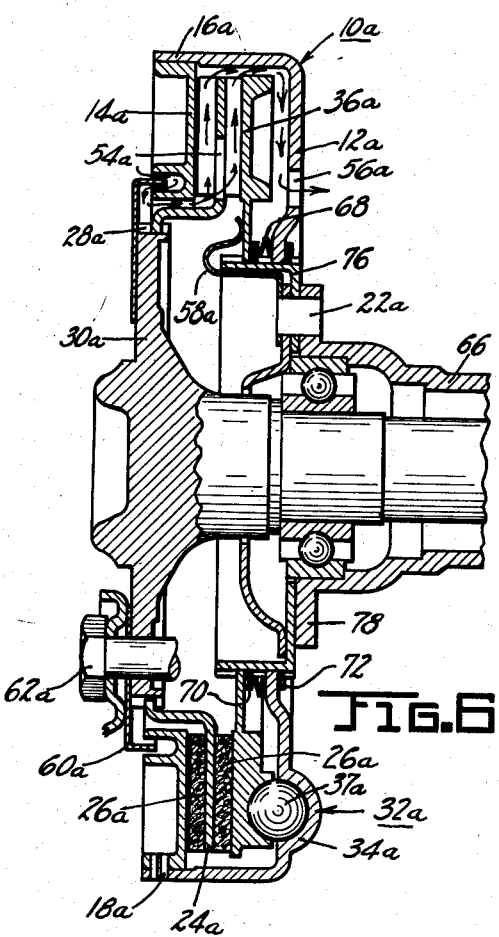
Figure 8:
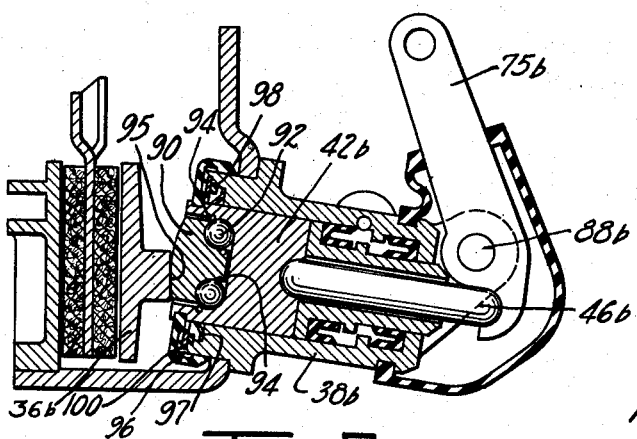

Figure 5 illustrates a disk brake adapted for use with the rear wheels and to be used in conjunction with the front wheel brakes illustrated in Figure 1. Figure 5 is a composite view illustrating in segments; (a) the outer surface of the brake reaction plate, (b) a section of the brake assembly taken on a plane passing between the pressure plate and rotor looking toward the inboard side of the brake, (c) a section of the brake assembly between the rotor and reaction plate looking toward the inboard side of the brake, (d) is a section view of the brake viewed in a plane passing between the pressure plate and backing plate, viewed toward the inboard side of the vehicle;

Figure 6 is a section view of the brake assembly taken on line 6—6 of Figure 5;

Figure 7 is a fragmental view illustrating a parking brake adapted for use with a disk brake of the type shown in Figure 5;

Figure 8 is a parking brake for mechanically applying a brake assembly of the type illustrated in Figure 5;

Figures 9, 10, 11 and 12 illustrate different mechanisms for exerting operator controlled effort in applying a disk brake such as that illustrated in Figures 1 to 6.

Referring first to the front wheel brake illustrated in Figures 1 to 4, a nonrotatable U-shaped cross section member designated generally by reference numeral 10 consists of a backing plate 12 and reaction plate 14 secured to cylindrical flange 16 by a plurality of fastening members 18; the nonrotatable backing plate 12 is in turn, secured to a suitable fixed member such as axle flange 20 by a plurality of fastening means 22.

A rotor 24, having friction pads 26 circumferentially spaced along either side thereof, has a splined connection 28 with a rotatable member such as hub 30. Located at spaced points around the circumference of the brake are a plurality of camming devices 32 consisting of ball-ramp combinations, the ramps 34 being recessed portions in the backing plate 12 with oppositely facing recesses in pressure plate 36. Balls 37 are adapted to ride up the ramp portions 34 upon relative circumferential movement of the pressure plate 36 and backing plate 12 thereby causing an axial thrust on the pressure plate 36.

Referring to Figure 3, operator-controlled hydraulic actuator 38 is operatively connected to pressure plate 36. The hydraulic actuator 38 consists of a wheel cylinder 40, a piston 42 reciprocably received therein, a sleeve 44 positioned in the head of said piston 42 and a thrust link 46 operatively engaging an abutment 48 on the pressure plate 36. The actuator 38 is received through an opening 50 in the support member 12. The support 12 is dished at 52 to accommodate the actuator.

It will be noted that the axis of the wheel cylinder 40 and the direction of movement of the thrust link 46 is inclined with respect to the pressure plate 36, at the same angularity as ramps 34. The purpose of this inclination will become clearer later in this disclosure in connection with the operation of the device.

In the present illustration of the invention, two oppositely located wheel cylinders are used. The actual number of wheel cylinder actuators is a matter of design preference; the number actually disclosed here is only for purposes of exemplification.

The rotor 24 is provided with plurality of openings 54 located between the friction pads 26 spaced around the circumference of the rotor. This permits passage of air through the brake assembly, around either side of the rotor in the direction and general path indicated by the arrows in Figure 4. The backing plate 12 contains a series of openings 56 which permit the air to pass through the brake assembly at the inboard side of the brake thereby making for complete circulation of air throughout the assembly.

A plurality of return springs 58 located in the recessed portions interconnect the support plate 12 and pressure plate 36 for yieldably urging the pressure plate 36 to retracted position. The brake assembly may include a suitable shield such as dust cover 60 fastened to the rotatable hub 30 by screws 62 as shown in Figure 4. There is sufficient clearance between the dust cover 60 and reaction plate 14 to permit the circulation of air therebetween.

Referring now to the embodiment illustrated in Figures 5 and 6, which is adapted for use in conjunction with the previous embodiment as the rear wheel brake, parts corresponding to the brake assembly of Figure 1 will be referred to by the same reference numeral with a subscript $a$ affixed thereto.

A U-shaped cross section member designated generally by reference numeral 10a is splined at 64 to a cup shaped nonrotatable member 76. The U-shaped cross section member 10a consists of a backing plate 12a and a reaction plate 14a arranged in parallel relationship to the backing plate and secured to a substantially cylindrical flange 16a of the backing plate 12a by a plurality of fastening members 18a.

A rotor 24a having a plurality of friction pads 26a on either side thereof has splined connection 28a with a rotatable member such as axle flange 30a. A plurality of camming devices 32a consisting of ball-ramp combinations are interposed between pressure plate 36a and backing plate 12a. The camming devices 32a consist of oppositely facing ramps 34a having a ball 37a associated therewith and adapted to ascend the ramp portions upon relative circumferential movement of the pressure plate 36a and backing plate 12a. As the ball 37a mounts the ramps 34a, it imparts axial applying thrust on the pressure plate 36a causing engagement with the rotor 24a.

A hydraulic actuator (not shown) of the same type previously described is received through an opening 50a in the support member 12a. The operator-controlled hydraulic actuator causes initial engagement of the pressure plate 36a with the rotor 24a.

Two spring washers 68 are compressed between retaining ring 70 and support 12a thereby urging the latter into engagement with retaining ring 72. Return springs 58a are used to yieldably urge the pressure plate 36a to retracted position. The backing plate 12a and the pressure plate 36a have splined connections 64 and 74 with a cup shaped member 76 secured by fastening means 22a to a flange 78 on axle housing 66. These splined connections allow a limited movement of the pressure plate 36a in one direction of rotation and a limited movement of the backing plate 12a in the other direction of rotation.

Openings 54a in rotor 24a permit circulation of air on either side of the rotor, the air then being expelled through openings 56a formed in the backing plate 12a. This circulation of air as a coolant through the brake assembly as shown by arrows in Figure 6 produces lower operating temperatures thereby reducing thermal effects on the braking operation.

The brake assembly is provided with a dust cover 60a which may be secured to the rotatable axle flange 30a in some suitable manner such as by bolts 62a.

The rear wheel brake is furnished with the mechanically actuated parking brake shown in Figure 7. The parking brake actuator consists of a lever 75 received through an opening 77 in a recessed portion 79 of the support plate 12a. End 80 of lever 75 engages an abutment 82 of pressure plate 36a. Spring 84 interconnecting end 80 of lever 75 and a post 86 carried by the backing plate 12a urges the lever 75 to an "off" position. The brake is mechanically applied by rotating lever 75; as it fulcrums about point of engagement 88 with backing plate 12a, the end 80 of lever 75 engaging abutment 82 produces a composite axial and circumferential movement of pressure plate 36a. The direction of force exerted by the lever 75 is along a line substantially coincident with the resultant movement of the pressure plate 36a. The angularity of actuating force exerted by the parking brake is substantially coincident with the angularity of ramps 34a. The rotor 24a is thus clamped between the reaction plate 14a and the pressure plate 36a tending to resist vehicle motion in either direction. The brake is released when the input effort on the lever 75 is released permitting spring 84 to rotate the lever to an "off" position.

Figure 8 illustrates a second parking brake adaptable for use on the rear wheel brake assembly of Figure 5. In this embodiment however, the mechanically applied parking brake is used in combination wtih a hydraulically actuated wheel cylinder device 38b. The actuating means consists of a lever 75b fulcruming on pin 88b and bearing against thrust rod 46b which is operatively connected to a piston 42b. A hardened insert 90 is rotatably mounted on anti-friction bearing 92 located in the head of the piston. The bearing 92 is retained in position by snap rings 94 located on either side of the bearing. The insert 90 is thus mounted in a manner permitting rolling movement. The contact point 95 between the pressure plate 36b and insert 90 is offset from the axis of rotation of the insert 90 so that rolling movement of the insert 90 is produced when the pressure plate 36b moves circumferentially. In this way frictional contact between the pressure plate 36b and abutting actuating means is reduced to a minimum since the bearing 92 substitutes for a frictional sliding effect a slight rolling motion between the engaging surfaces of the pressure plate and actuator. Automatic adjusting mechanism 96 consisting of a one-way clutch, varies the retracted position of piston 42b as a function of the extent of lining wear on the rotor of the brake. Automatic adjuster 96 includes a toothed washer 97 which bites into the periphery of the piston 42b preventing further retractile movement of the piston 42b when the adjustor is in the position indicated in Figure 8. Clearance between the rotatable and nonrotatable members is established by the distance between the washer 97 in the position indicated in Figure 8 and the point of contact of the washer 97 with annulus 98 which is retained in position by retaining ring 100.

Figure 9:
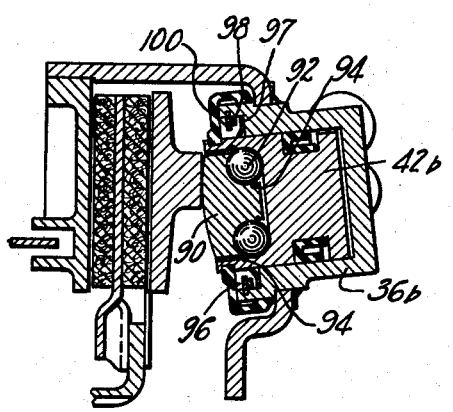

Figure 9 illustrates the hydraulic actuator of Figure 8 without the parking brake mechanism. Figure 9 also demonstrates the possibility of locating the wheel cylinder construction at a relatively different circumferential location in the brake assembly.

The operation of the embodiment illustrated in Figure 9 is the same as that shown in Figure 8, the only difference being that the embodiment of Figure 8 may be mechanically as well as hydraulically applied.

Figure 10:
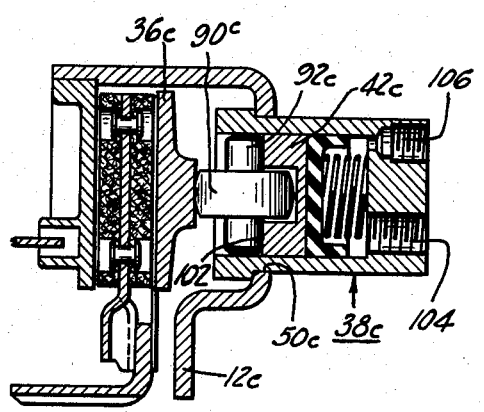

The embodiment illustrated in Figure 10 is a further adaptation for accomplishing substantially frictionless actuation of the pressure plate. In Figure 10 the wheel cylinder 38c is received in an opening 50c in the support member 12c. Reciprocably mounted in the wheel cylinder 38c is a piston 42c. Roller 90c is mounted on a pin 92c journaled at opposite ends 102 in the head of piston 42c. Roller 90c contacts pressure plate 36c in such a manner that circumferential movement of the pressure plate causes rolling of member 90c thereby substantially eliminating frictional contact between the actuator 38c and pressure plate 36c. Instead of sliding movement between the parts the roller movement takes into account the composite axial and circumferential movement of the pressure plate by turning at journaled ends 102. The wheel cylinder 38c is provided with the conventional inlet and bleed passages 104 and 106.

Referring to Figure 11 wheel cylinder 38d is suitably secured to support member 12d by press fitting or the like through opening 50d. Piston 42d, reciprocably mounted in wheel cylinder 38d, is provided with a hardened insert 90d having a stem 108 received in an opening 110 in the head of the piston 42d. Pin 112 positioned in the piston 42d is fitted into an annular groove in the stem 110 thereby retaining the insert 90d in operative position. The insert 90d is adapted for rolling movement on bearing 92d upon circumferential movement of pressure plate 36d. The pressure plate 36d contacts insert 90d at point 95d slightly offset from the rolling axis of insert 90d to produce the beforementioned rolling movement of the insert 90d. Circumferential movement of the pressure plate is translated into rotary movement of the insert 90d thus reducing frictional contact between the input force of the wheel cylinder and the pressure plate 36d. In this manner frictional contact between the actuator and the pressure plate is minimized.

If it is desired to mount the wheel cylinder perpendicularly to the backing plate for design purposes, the contact point between the pressure plate and hardened insert may be offset by proper relative location such as that illustrated in Figure 12. In Figure 12 the offset contact 95e between the insert 90e and pressure plate is provided for by inclination of a projection 108 on the pressure plate 36 to produce rolling of insert 90e upon circumferential movement of pressure plate 36.

Referring now to the embodiment illustrated in Figures 1 to 4 the operation of the novel brake mechanism is as follows:

Operator generated fluid pressure from an appropriate master cylinder source (not shown) causes movement of the piston 42 (see Figure 3) in a generally downward direction. This movement of the piston brings about axial and circumferential movement of pressure plate 36 thereby engaging pressure plate 36 with one of the sides of the rotor 24; the rotor 24 having splined connection 28 with wheel hub 30 is forced to slide axially into frictional engagement with reaction plate 14. The engagement of the pressure plate 36 with the rotor 24 causes camming devices 32 to exert axial thrust on the pressure plate 36, clamping the rotor 24 between the pressure plate 36 and reaction plate 14. The torque reaction from the interengagement of the rotor 24, pressure plate 36, and reaction plate 14 is transmitted through the support member 12 to the nonrotatable axle flange 20.

From a consideration of the operation of the brake unit it will be noted that the movement of the pressure plate is a composite axial and circumferential motion. It is important for the input force actuating the brake to be exerted in the same general direction as the member to be applied, and for this reason the wheel cylinder in the present invention is oriented so that the axis thereof is in the same general direction as the resultant movement of the pressure plate to be applied thereby. That is, the thrust link 46 has the same general direction imposed thereupon as the member which it is designed to actuate. This novel location of the actuating means produces maximum backing for a given input force and minimum angularity of the connecting link during actuation and retraction of the pressure plate 36.

When the operator releases the pressure generated in the wheel cylinder 38, return springs 58 retract the pressure plate 36, disengaging its frictional contact with rotor 24 and releasing frictional contact of rotor 24 with reaction plate 14.

Rotor 24 by reason of the circumferentially spaced friction pads 26, acts as a pump driving air through the braking system, the general direction of which is shown in Figure 4. The openings 54 in the rotor by-pass the inflowing air on either side of the rotor and cause complete circulation of air around the periphery of the brake assembly. The passage of air is then across and between the ramps of the camming devices, and through the openings 56 where the air is expelled to complete the circulation through the system.

Referring now to the embodiment illustrated in Figures 5 and 6 which is adapted for use as a rear wheel brake, fluid pressure from a master cylinder source (not shown) produces frictional engagement of pressure plate 36a with rotor 24a. The splined connections 74 and 28a of the pressure plate 36a and rotor 24a permit axial movement of both these members to bring about frictional engagement of the rotor 24a and reaction plate 14a. When the pressure plate 36a contacts the rotor 24a, it undergoes slight circumferential movement whereupon camming devices 32a produce additional axial thrust thereon, clamping the rotor 24a between the pressure plate 36a and reaction plate 14a.

The torque reaction from frictional interengagement of the pressure plate 36a and rotor 24a, is transmitted through the camming devices 32a to the backing plate 12a having splined connection with cup shaped member 76 which transfers the torque reaction to the nonrotatable axle housing 66. Torque reaction from engagement on rotor 24a with reaction plate 14a is transmitted to the backing plate 12a by pins 18a.

Referring to segment d of Figure 5, the splined connection 64 between the backing plate 12a and cup shaped member 76 is so designed that the interfitting notches contact immediately to resist relative turning of the backing plate 12a and member 76 in one direction. That is, the backing plate anchors on splined connection 64 in braking forward rotation of rotor 24a as torque reaction is transmitted thereto via the camming devices 32a and pins 18a.

It is necessary that the rear wheel brakes do not diminish in effectiveness with reverse vehicle motion because of the reduced effectiveness of the front wheel brakes. The anchoring action of the backing plate 12a against the cup shaped member 76 with reverse vehicle motion would deenergize the brake, therefore anchoring in this direction of motion is accomplished through the splined connection 74 of the pressure plate 36a with the cup shaped member 76. This is best seen in sector b of Figure 5. With reverse direction of vehicle motion, the engagement of the pressure plate 36a with the rotor 24a tends to cause circumferential movement of the pressure plate in a direction opposite that for forward braking. The interlocking teeth of splined connection 74 abut to transmit to the cup shaped member 76 the torque reaction from engagement of pressure plate 36a with rotor 24a. The torque reaction from engagement of rotor 24a with reaction plate 14a is transmitted to the pressure plate via the backing plate 12a and camming devices 32a. With circumferential movement of the pressure plate, the camming devices 32a again produce additional axial thrust thereon, frictionally clamping the rotor 24a between the reaction plate 14a and the pressure plate 36a. In reverse braking, as well as forward braking, the direction of motion of the input force exerted by the wheel cylinder on the pressure plate 36 is on a line along the path of the resultant axial and circumferential movement of the pressure plate 36.

The spinning movement of rotor 24a has a pumping effect, circulating air in the same manner as that described for the front wheel brakes. The openings 54a in the rotor and openings 56a in the support plate 12a permit circulation of air through the brake assembly thereby reducing the operating temperatures and minimizing thermal effects on the braking characteristics.

Although certain particular embodiments of my invention have been described, it will be understood by those skilled in the art that the object of the invention may be attained by use of constructions different in certain respects from those disclosed without departing from the underlying principles of the invention.

I claim:

1. A disk brake comprising a nonrotatable backing plate, a rotor, a pressure plate axially movable into frictional engagement with said rotor upon relative circumferential movement of said pressure plate with respect to said backing plate, and operator-controlled means for initially producing actuation of said pressure plate, said means including a wheel cylinder, a piston reciprocably received in said wheel cylinder, an insert received in the outer face of said piston and rotatable on an axis substantially coincident with the wheel cylinder axis, antifriction bearings between said insert and piston, said bearings consisting of a plurality of hardened balls, and means for automatically varying the retractile stroke of said piston, the axis of said cylinder being inclined and the contact point between said insert and pressure plate being offset from the rotative axis of said insert thus causing turning of said insert upon circumferential movement of said pressure plate.

2. A disk brake comprising a rotor, a pressure plate axially movable into frictional engagement with said rotor, a plurality of camming devices adapted to impart axial actuating thrust on said pressure plate upon circumferential movement thereof, and means for initially engaging said pressure plate and rotor, said means including a wheel cylinder, a piston, an insert located intermediate said pressure plate and piston and a plurality of anti-friction bearings between said insert and piston, said insert having a surface of engagement with said pressure plate located offset from the longitudinal axis of said wheel cylinder which defines the axis of rotation of said insert to provide a turning movement effective for rotating said insert responsively to circumferential movement of said pressure plate, said insert being thereby capable of rolling movement to reduce frictional contact between said insert and pressure plate as circumferential movement of the pressure plate is produced from frictional engagement with said rotor.

3. A disk brake comprising a rotor, a pressure plate axially actuated into frictional engagement with said rotor, a backing plate, a plurality of camming devices capable of imparting axial applying thrust on said pressure plate upon relative circumferential movement between said pressure plate and backing plate, and means for initially engaging said pressure plate and rotor, said means including a wheel cylinder, a piston, and a hardened insert fitted into the head of said piston and contacting said pressure plate, a plurality of anti-friction bearings disposed between the forward ends of said pistons and said hardened inserts to provide rolling of said insert on an axis substantial by coincident with the wheel cylinder axis, said insert having a surface of engagement which is offset with respect to the axis of turning movement of said insert whereby relative circumferential movement of said pressure plate and backing plate produces rolling movement of said insert in a manner reducing frictional contact between said actuating means and pressure plate.

4. A disk brake comprising a nonrotatable backing plate, a rotor, a pressure plate axially movable into frictional engagement with said rotor upon relative circumferential movement of said pressure plate with respect to said backing plate, and operator-controlled means for initially producing actuation of said pressure plate, said means including a wheel cylinder, a piston reciprocably received in said wheel cylinder, and an insert received in the outer face of said piston and rotatable on an axis substantially coincident with the wheel cylinder axis, a plurality of anti-friction bearings between said insert and piston, the axis of said cylinder being inclined and the contact point between said insert and pressure plate being offset from the rotative axis of said insert thus causing turning of said insert upon circumferential movement of said pressure plate.

5. An actuator in cooperation with a circumferentially movable pressure plate having an annular projection at one side thereof with a continuous bearing surface, a wheel cylinder, a piston reciprocably mounted in said cylinder, an insert mounted in the outer face of said piston for rolling movement on an axis substantially coincident with the wheel cylinder axis and having a surface of engagement with said projection offset relatively to the axis of rolling movement thereof to provide a turning force on said insert effecting anti-frictional movement between said insert and pressure plate during circumferential movement of said pressure plate.

6. A disk brake comprising a nonrotatable backing plate, a rotor, a pressure plate axially movable into frictional engagement with said rotor upon relative circumferential movement of said pressure plate with respect to said backing plate and operator-controlled means for initially producing actuation of said pressure plate, said means including a wheel cylinder, a piston reciprocably received in said wheel cylinder, an insert in the outer face of said piston and rotatable on an axis substantially coincident the wheel cylinder axis, anti-friction bearings between said insert and piston, the axis of said cylinder being inclined and the contact point between said insert and pressure plate being offset from the rotative axis of said insert causing turning of said insert upon circumferential movement of said pressure plate.

References Cited in the file of this patent

UNITED STATES PATENTS

| | | |
|---|---|---|
| 1,717,522 | Rosenberg | June 18, 1929 |
| 1,962,406 | Pentz | June 12, 1934 |
| 1,989,179 | Versluis | Jan. 29, 1935 |
| 2,029,070 | Higbee | Jan. 28, 1936 |
| 2,052,902 | Tatter | Aug. 11, 1936 |
| 2,097,873 | Evans | Nov. 2, 1937 |
| 2,099,489 | Lambert | Nov. 16, 1937 |
| 2,126,661 | Provinson | Aug. 9, 1938 |
| 2,148,786 | Swennes | Feb. 28, 1939 |
| 2,245,987 | Lambert | June 17, 1941 |
| 2,262,708 | Lambert | Nov. 11, 1941 |
| 2,262,709 | Lambert | Nov. 11, 1941 |
| 2,277,106 | Hewitt | Mar. 24, 1942 |
| 2,313,432 | Goepfrich | Mar. 9, 1943 |
| 2,326,961 | McCune | Aug. 17, 1943 |
| 2,231,259 | Whitten | Oct. 5, 1943 |
| 2,467,980 | Lambert | Apr. 19, 1949 |
| 2,505,600 | Wissman | Apr. 25, 1950 |
| 2,516,966 | Du Bois | Aug. 1, 1950 |
| 2,526,143 | Lambert | Oct. 17, 1950 |
| 2,621,762 | Bachman | Dec. 16, 1952 |

FOREIGN PATENTS

| | | |
|---|---|---|
| 587,306 | Great Britain | Apr. 21, 1947 |